United States Patent
Katano

(10) Patent No.: US 8,697,299 B2
(45) Date of Patent: Apr. 15, 2014

(54) FUEL CELL SYSTEM WITH ANODE OFF-GAS DILUTION DEVICE

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 289 days.

(21) Appl. No.: 12/742,512

(22) PCT Filed: Oct. 14, 2008

(86) PCT No.: PCT/JP2008/068531
§ 371 (c)(1),
(2), (4) Date: May 12, 2010

(87) PCT Pub. No.: WO2009/063713
PCT Pub. Date: May 22, 2009

(65) Prior Publication Data
US 2010/0261093 A1    Oct. 14, 2010

(30) Foreign Application Priority Data

Nov. 16, 2007  (JP) .................................. 2007-297820

(51) Int. Cl.
*H01M 8/06* (2006.01)
(52) U.S. Cl.
USPC ............ 429/415; 429/443; 429/408; 429/428
(58) Field of Classification Search
USPC .......................... 429/415, 443, 408, 428, 512
See application file for complete search history.

(56) References Cited

U.S. PATENT DOCUMENTS

| | | | |
|---|---|---|---|
| 2004/0062975 A1* | 4/2004 | Yamamoto et al. | 429/34 |
| 2004/0106021 A1* | 6/2004 | Kanai et al. | 429/22 |
| 2005/0280166 A1* | 12/2005 | Katagiri et al. | 261/75 |
| 2007/0259233 A1* | 11/2007 | Yang et al. | 429/26 |

FOREIGN PATENT DOCUMENTS

| | | | | |
|---|---|---|---|---|
| DE | 603 07 959 T2 | 1/2007 | | |
| JP | 2000-348751 A | 12/2000 | | |
| JP | 2003-132915 A | 5/2003 | | |
| JP | 2004-127666 A | 4/2004 | | |
| JP | 2005-116467 A | 4/2005 | | |
| JP | 2005-158576 A | 6/2005 | | |
| JP | 2005-163812 A | 6/2005 | | |
| JP | 2006294297 A | * 10/2006 | ............. | H01M 8/04 |
| JP | 2007-134064 A | 5/2007 | | |

* cited by examiner

*Primary Examiner* — Zachary Best
(74) *Attorney, Agent, or Firm* — Kenyon & Kenyon LLP

(57) ABSTRACT

A fuel cell system which can encase a dilution device while keeping the height of a fuel cell case as low as possible by utilizing the lower space in the case effectively. A fuel cell system comprises a fuel cell stack generating power through an electrochemical reaction between a gas supplied to the anode side and a gas supplied to a cathode side, a dilution device for diluting an anode off gas discharged from the fuel cell stack with a cathode off gas and discharging the diluted gas, and a fuel cell case for encasing the fuel cell stack and the dilution device. In this fuel cell system, a lateral opening of the fuel cell case for passing an exhaust pipe extending to the exhaust downstream of the dilution device is arranged above the lowermost portion of the inner surface of the dilution device with respect to the gravitational direction.

6 Claims, 3 Drawing Sheets

FUEL CELL SYSTEM WITH ANODE OFF-GAS DILUTION DEVICE

This is a 371 national phase application of PCT/JP2008/068531 filed 14 Oct. 2008, claiming priority to Japanese Patent Applications No. JP 2007-297820 filed 16 Nov. 2007, the contents of which are incorporated herein by reference.

TECHNICAL FIELD

The present invention relates to a fuel cell system, and more particularly to an emission device in connection with a dilution device for diluting and emitting an anode off-gas drained from a fuel cell stack.

BACKGROUND ART

In recent years, a fuel cell stack has been mounted on automobiles or other vehicles due to its lowered influence on the environment. A fuel cell stack supplies, e.g., a fuel gas, such as hydrogen or the like, to the anode side of a fuel cell and an oxidizing gas containing oxygen, e.g., air, to the cathode side of the same, and obtains required electric power through electrochemical reaction occurring through an electrolyte membrane.

A cathode off-gas drained when the oxidizing gas supplied to the cathode side is drained from the fuel cell stack contains reaction-generated water generated in electrochemical reaction. Meanwhile, an anode off-gas drained when the fuel gas supplied to the anode side is drained from the fuel cell stack also contains reaction-generated water having passed through an electrolyte membrane of the fuel cell.

The anode off-gas is sent to a dilution device by opening, at a predetermined timing, a purge valve provided on a pipe connecting between the anode off-gas outlet of the fuel cell stack and the dilution device. The cathode off-gas as well is sent from the fuel cell to the dilution device through a pipe. In the dilution device, the anode off-gas is mixed with the cathode off-gas for dilution before being emitted to the outside. In the above, reaction-generated water contained in the cathode off-gas and the anode off-gas is also drained.

The pipe connecting between the anode off-gas outlet of the fuel cell stack and the purge valve and the pipe connecting between the purge valve and the dilution device are preferably disposed so as to descend toward downstream in the off-gas emission direction in order to reliably drain the reaction-generated water contained in the anode off-gas. Further, in order to ensure electrical insulation for the fuel cell stack between the purge valve and the dilution device, the purge valve and the dilution device are generally connected using, e.g., a rubber tube made of an insulating member. In this case, in order to ensure sufficient insulation for a high-voltage fuel cell stack, a rubber tube of some length must be used. When such tube is used, there must be ensured a height difference of e.g., a few tens of centimeters between the anode off-gas outlet of the fuel cell stack and the anode off-gas inlet of the dilution device in order to ensure drainability and sufficient insulation effect.

For example, Patent Document 1 discloses that a pipe for introducing water drained from a fuel cell system to an emission pipe is disposed descending toward downstream in a fluid flowing direction so that fluid can easily flow inside the pipe.

[Patent Document 1] Japanese Patent Laid-open Publication No. 2005-163812

DISCLOSURE OF INVENTION

Problem to be Solved by the Invention

Attempts have been made to accommodate a fuel cell stack and related elements in a fuel cell case and to mount the case in a space below a floor of a vehicle. The fuel cell case is desired to have the smallest possible height in order to ensure the largest possible space in the vehicle interior.

However, a structure in which a dilution device is placed inside a fuel cell case while ensuring a height difference of a few tens of centimeters, as described above, requires a case having a large height. Moreover, a large dilution device is required so that a large interior space can be ensured for sufficient mixing and dilution. Therefore, in mounting a fuel cell case below a floor, a structure of accommodating a dilution device inside the case hinders suppression of the height of the case.

In view of the above, an object of the present invention is to provide a fuel cell system which efficiently utilizes a lower space inside a fuel cell case to enable accommodation of a dilution device in the case, while suppressing the height of the case to the greatest possible extent.

Means to Solve the Problem

A fuel cell system according to the present invention comprises a fuel cell for generating power through electrochemical reaction between a gas to be supplied to an anode side and a gas to be supplied to a cathode side; a dilution device for diluting an anode off-gas drained from the fuel cell with a cathode off-gas and emitting the anode off-gas; and a fuel cell case for accommodating the fuel cell and the dilution device in an interior thereof, wherein a side surface opening of the fuel cell case, through which an emission pipe extending toward downstream in an emission direction of the dilution device passes, is formed at a position upper in a gravity direction than the lowest portion of an inner surface of the dilution device.

With this structure, as the side surface opening of the fuel cell case, through which an emission pipe extending toward downstream in the emission direction of the dilution device passes, is formed at a position upper in the gravity direction than the lowest portion of the inner surface of the dilution device, it is possible to efficiently utilize a space below the side surface opening inside the case as a space for mounting a dilution device, while ensuring, for the side surface opening of the fuel cell case, an ascending edge from the lower surface toward the side surface opening of the dilution device. This makes it possible to maximize the capacity of the dilution device inside the case.

In the fuel cell system, preferably, an ejection outlet through which the anode off-gas is ejected to the interior of the dilution device may be formed on an upstream side in the emission direction to the lowest portion of the inner surface of the dilution device.

With this structure, even in the case where generated water returns from the emission pipe to the interior of the dilution device, the returned water pools on the lowest portion of the inner surface, and even in the case where the pooling water freezes due to lowered outside temperature, closing of the ejection outlet located upstream of the lowest portion of the inner surface can be suppressed.

In the fuel cell system according to the present invention, preferably, the ejection outlet through which the anode off-gas is ejected to the interior of the dilution device may be formed at a position upper, in the gravity direction, than the lowest portion of the inner surface of the dilution device.

With this structure, even in the case where generated water returns from the emission pipe to the interior of the dilution device, the returned water pools on the lowest portion of the inner surface, and even in the case where the pooled water freezes due to lowered outside temperature, closing of the ejection outlet located at a position higher, in the gravity direction, than the lowest portion of the inner surface can be suppressed.

In the fuel cell system according to the present invention, preferably, the anode off-gas may be ejected toward the flow of the cathode off-gas in the manner of being opposed thereto in the dilution device.

Note that "so as to be opposed to" mentioned here does not refer exclusively to a case in which the anode off-gas is ejected in a direction completely opposite the drain direction of the cathode off-gas, but encompasses all ejection directions which comprise, when an anode off-gas ejection direction is subjected to vector analysis, a directional component which is completely opposite to the drain direction of the cathode off-gas.

According to this structure, the ejected anode off-gas bumps into the flow of a cathode off-gas in the manner of being opposed thereto. This facilitates mixing of the respective off-gases and thus enables efficient dilution in a smaller space of the dilution device. This is advantageous in reducing the size of a dilution device.

In the fuel cell system, an emission pipe may be connected such that a humidifier for moisturizing a gas to be supplied to the cathode side of the fuel cell may be disposed downstream, in the emission direction, of the dilution device.

According to this structure, generated water contained in the anode off-gas and the cathode off-gas can be collected in a humidifier and used again to moisturize the cathode gas. This enables efficient moisturizing.

Figure 1:
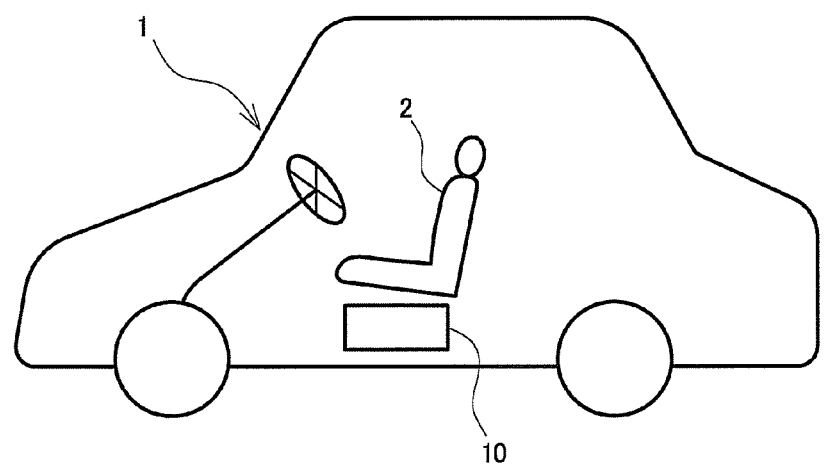
FIG. 1 is a schematic structural diagram of a fuel cell automobile with a fuel cell system according to one embodiment of the present invention mounted therein.

BRIEF DESCRIPTION OF REFERENCE NUMERALS 1 fuel cell automobile, 2 front seat, 8 fuel cell system, 10 fuel cell case, 11 bottom surface or lower surface, 12 fuel cell stack, 13 side surface, 13a opening, 13b edge, 14 purge valve, 15 connecting pipe, 16 air pressure adjustment valve, 18 dilution device, 20 fuel tank, 22 injector, 24 pipe, 26 pressure gauge, 27 circular booster, 28 air cutoff valve, 30 introduction pipe, 32 dilution part, 33 ejection outlet, 34 emission pipe, 36 lower surface, 38 lower surface lowest portion, 40 humidifier, 42 oxidizing gas source, 44 air compressor, and 50 elastic member.

BEST MODE FOR CARRYING OUT THE INVENTION

Below, an embodiment according to the present invention will be described with reference to the accompanying drawings. In this description, specific shapes, materials, and so forth are merely examples for facilitating understanding of the present invention and can be desirably changed according to use, purpose, specifications, and so forth.

FIG. 1 is a diagram showing a schematic structure of a fuel cell automobile 1 equipped with a fuel cell system according to one embodiment of the present invention. The fuel cell automobile 1 has a fuel cell case (hereinafter referred to as a "FC case") 10, or a structural element of a fuel cell system, mounted below a floor beneath a front seat 2.

Figure 2:
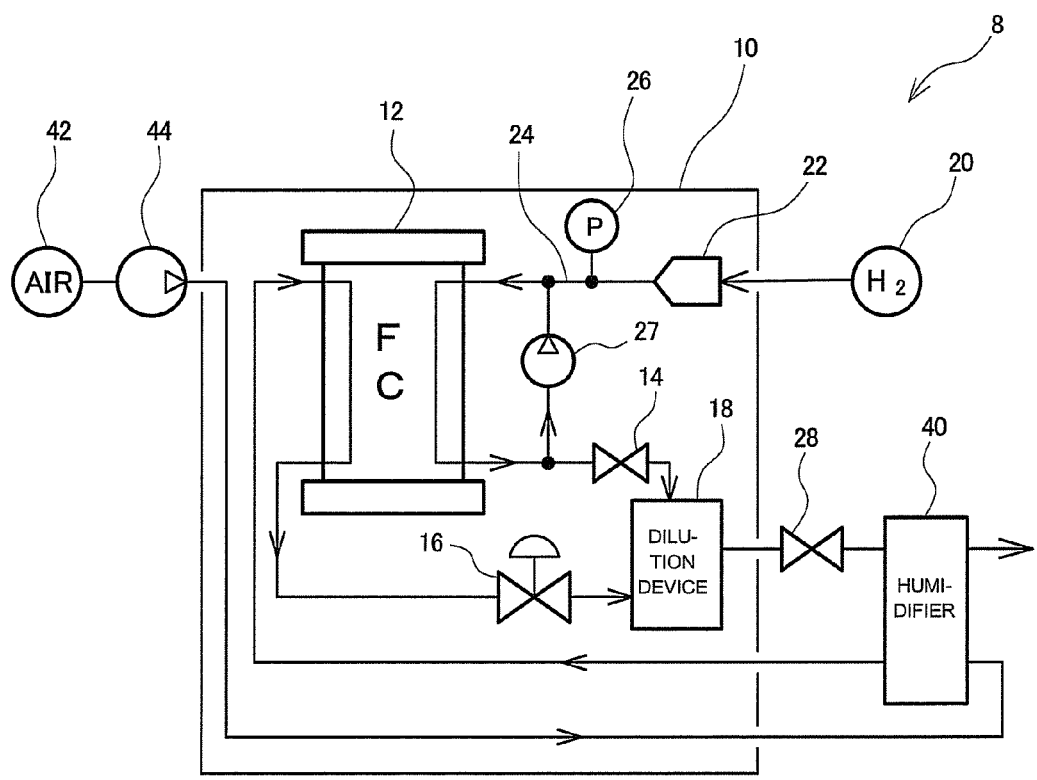
FIG. 2 is a schematic structural diagram of a fuel cell system.

FIG. 2 shows a schematic structure of a fuel cell system 8 according to the present embodiment. FIG. 2 shows the fuel cell system 8 viewed from above. The fuel cell system 8 comprises elements including a fuel cell stack 12 serving as a fuel cell and the like which are accommodated in the FC case 10, a humidifier 40 connected to the interior structural elements of the FC case 10, and so forth. The FC case 10 is formed from a compressed-rectangular enclosure whose height in the gravity direction is shorter than other edges of the FC case. The FC case 10 is made by, e.g., bending, welding, and screwing a metal plate. Inside the FC case 10 are accommodated the fuel cell stack 12, a purge valve 14, an air pressure adjustment valve 16, a dilution device 18, and so forth. The fuel cell stack 12 is fixed on the lower surface or a bottom surface of the FC case 10 via an insulating member (not shown).

The fuel cell stack 12 comprises a plurality of unit cells being stacked one on the other, each unit cell having an MEA (Membrane Electrode Assembly), and separators disposed on the respective outer sides of the MEA so as to sandwich the MEA, the MEA including an electrolyte membrane and catalyst electrode layers disposed on the respective sides of the electrolyte membrane. The fuel cell stack 12 has a function for generating power through electrochemical reaction occurring through an electrolyte membrane with a fuel gas, such as hydrogen or the like, supplied to the anode side and an oxidizing gas containing oxygen, e.g., air, supplied to the cathode side to thereby obtain required electric power.

Into the gas inlet on the anode side of the fuel cell stack 12, a hydrogen gas is supplied from a fuel tank 20, which is installed outside the case, via an injector 22 disposed inside the case. The injector 22 has a function for adjusting a hydrogen gas from the fuel tank 20 so as to have appropriate pressure and flow amount and ejecting the resultant hydrogen gas. A pressure gauge 26 is connected to a pipe 24 extending from the injector 22 to the fuel cell stack 12. The pressure gauge 26 detects pressure of a hydrogen gas to be supplied to the fuel cell stack 12. Note that although in FIG. 2 the injector 22 and the pressure gauge 26 are disposed inside the FC case 10, this is not an exclusive example, and the injector 22 and the pressure gauge 26 may be disposed outside the FC case 10.

The anode side outlet of the fuel cell stack 12 is connected to the dilution device 18 via the purge valve 14. The purge valve 14 is controlled to be temporarily opened at a predetermined timing. With the purge valve 14 closed, an anode off-gas drained from the anode side outlet is boosted by, e.g., a circular booster 27, or a pump, and fed back to the anode side inlet of the fuel cell stack 12 to be reused. While being circulated as described above, hydrogen in the anode off-gas is consumed through electrochemical reaction so that hydrogen concentration is lowered, and comes to contain more nitrogen and electrochemical reaction-generated water having passed through an electrolyte membrane from the cathode side to the anode side. The dilution device 18 mixes the anode off-gas which contains hydrogen, water, and so forth, drained from the fuel cell stack 12 and a cathode off-gas to thereby dilute the anode off-gas, and then emitted the diluted anode off-gas to the outside of the FC case 10.

Downstream in the emission direction, the dilution device 18 is connected to the humidifier 40 via an air cutoff valve 28 provided outside the case. When a part connected using an insulating pipe, such as, e.g., a rubber tube, or the like, is provided between the dilution device 18 and the air cutoff valve 28 or between the air cutoff valve 28 and the humidifier 40, electric insulation is ensured within and outside the FC case 10. With the air cutoff valve 28 open, a drained gas from the dilution device 40 is demoisturized by a porous member in the humidifier 40 while passing through the humidifier 40 before being emitted to the outside via a silencer (also referred to as a muffler) (not shown).

The fuel cell automobile 1 has an oxidizing gas source 42, or a supply source of an oxidizing gas, such as, e.g., oxygen, to be supplied to the cathode side of the fuel cell stack 12, the supply source being provided outside the case. In actuality, air which contains oxygen can be used as the oxidizing gas source 42. Air from the oxidizing gas source 42 is boosted by an air compressor (ACP) 44 and then suitably moisturized while passing through the humidifier 40 before being supplied to the cathode side inlet of the fuel cell stack 12. Although in the present embodiment the oxidizing gas source 42 and the air compressor 44 are provided on the opposite side from the fuel tank 20 relative to the FC case 10, this is not an exclusive example, and the oxidizing gas source 42 and the air compressor 44 may be disposed on the same side where the fuel tank 20 is disposed, relative to the FC case 10. Such structure produces an advantage in that the length of the air supply path from the air compressor 44 to the humidifier 40 can be shortened.

The cathode side outlet of the fuel cell stack 12 is connected to the dilution device 18 via the air pressure adjustment valve 16. The air pressure adjustment valve 16 is referred to also as a back pressure valve and has a function for adjusting gas pressure at the cathode side outlet and the flow amount of the air to be supplied to the fuel cell stack 12. For the air pressure adjustment valve 16, a valve, such as, e.g., a butterfly valve, capable of adjusting the effective opening of a flow path can be used. A cathode off-gas drained from the cathode outlet is used as a dilution gas for diluting the hydrogen contained in the anode off-gas in the dilution device 18 so that hydrogen concentration is reduced to a predetermined concentration or smaller. The cathode off-gas contains water generated through electrochemical reaction in the fuel cell stack 12.

Figure 3:
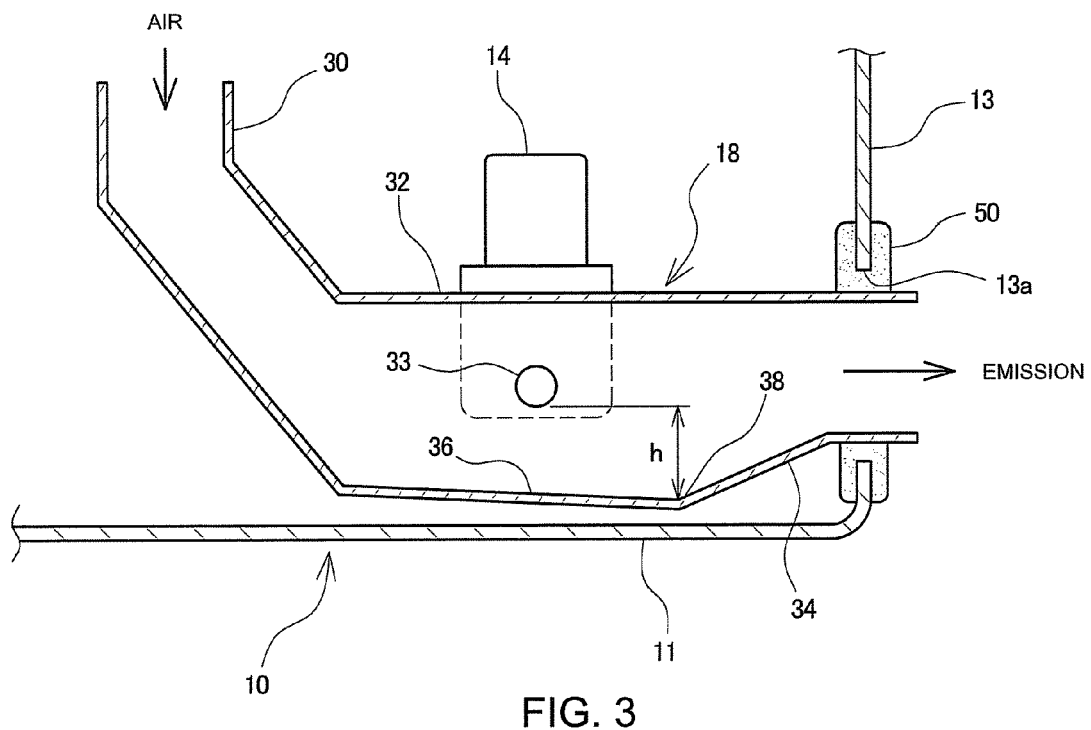
FIG. 3 is a cross sectional view, in the gravity direction, of a dilution device of the fuel cell system shown in FIG. 2.

FIG. 3 is a cross sectional view in the gravity direction of the dilution device 18, or a structural element of an emission device of the fuel cell system 8 according to the present embodiment. The dilution device 18 comprises an introduction pipe 30 for introducing air, or a cathode off-gas; a dilution part 32 for diluting the anode off-gas ejected from the purge valve 14 by mixing the anode off-gas and air; and an emission pipe 34 for draining the diluted emission gas. The dilution device 18 is disposed in the vicinity of the bottom surface 11 of the FC case 10.

Preferably, the dilution part 32 of the dilution device 18 has a large interior space so as to promote sufficient dilution of the anode off-gas, and is made from a barrel having the cross section of, e.g., a circle, oval, substantially square, or the like, in the direction perpendicular to the emission direction. The lower surface 36 constituting a part of the inner surface of the dilution part 32 is formed descending toward downstream in the emission direction so that a part thereof where the lower surface 36 shifts to an ascending slope; that is, a boundary to the downstream-side emission pipe 34, constitutes the lowest portion 38. Note that the upper surface and the lower surface of the dilution part 32 may be formed in parallel to each other, and that the dilution device 18 may be installed inclining such that the lower surface thereof has descending inclination. Alternatively, the lower surface 36 of the dilution part 32 may be formed or placed in parallel to the horizontal direction so that the entire lower surface 36 constitutes the lowest portion.

As shown in FIG. 3, an ejection outlet 33, via which the anode off-gas is ejected from the purge valve 14 to the inside of the dilution part 32, is located upstream of the lowest portion 38 in the emission direction. Moreover, the ejection outlet 33 is formed at a position upper or higher in the gravity direction than the lowest portion 38 so that a height difference h relative to the lowest portion 38 can be ensured. With the ejection outlet 33 provided in the above-described position, closing of the ejection outlet can be suppressed even in the case where the water pooling on the lower surface 36 including the lowest portion 38 of the dilution part 32 freezes due to lowered outside temperature.

Although in the present embodiment it is described in the above that the ejection outlet 33 is formed at a position upstream in the emission direction of, and higher in the gravity direction than, the lowest portion 38 inside the dilution device 18, this is not an exclusive example, and the ejection outlet 33 which satisfies either one of the above described conditions; that is, being provided at a position either upstream in the emission direction or higher in the gravity direction, can be suppressed from being closed due to freezing.

Figure 4A:
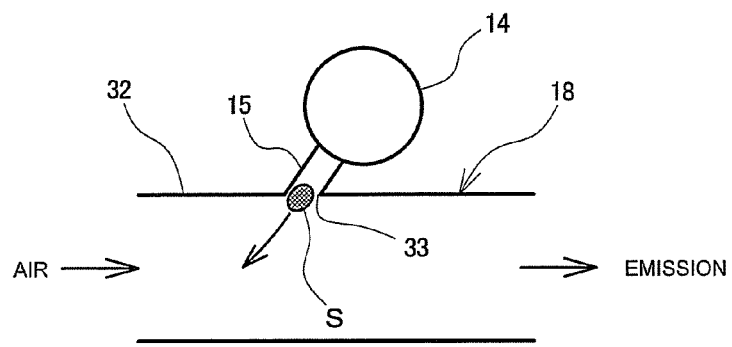
FIG. 4A is a diagram schematically showing a dilution device and a purge valve connected thereto as viewed from above.
Figure 4B:
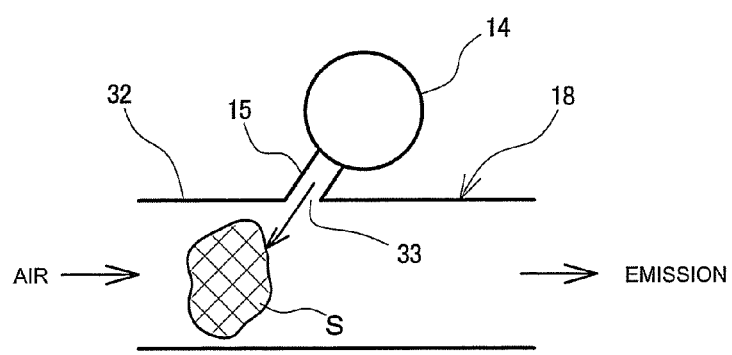
FIG. 4B is a diagram, similar to FIG. 4A, schematically showing a dilution device and a purge valve connected thereto as viewed from above.

FIGS. 4A and 4B are diagrams showing the purge valve 14 and the dilution device 18 as viewed from above. The purge valve 14 is disposed in the vicinity of the lateral side in the horizontal direction of the dilution part 32 of the dilution device 18. The purge valve 14 and the dilution part 32 are connected by a connecting pipe 15, whose outlet constitutes the ejection outlet 33. The connecting pipe 15 is connected diagonally relative to the axial direction of the dilution part 32, so that the anode off-gas to be ejected via the connecting pipe 15 toward upstream in the emission direction inside the dilution part 32 is ejected diagonally relative to the air flow of the cathode off-gas in the manner of being opposed thereto. With this structure, the ejected anode off-gas bumps into the flow of the cathode off-gas in the manner of being opposed thereto, upon which a highly concentrated hydrogen portion S in the anode off-gas quickly expands in the emission direction and the direction intersecting therewith so that high hydrogen concentration can be readily reduced; that is, hydrogen can be readily diluted. As a result, efficient dilution within a small space is achieved, which is advantageous in reducing the size of a dilution part. Further, provision of the purge valve 14 on the lateral side in the horizontal direction of the dilution device 18 eliminates a need to ensure a large height difference between the purge valve 14 and the dilution device 18, which is advantageous in reducing the height of the FC case 10.

The emission pipe 34 of the dilution device 18 extends from the dilution part 32 toward downstream in the emission direction, passing through an opening 13a formed on the side surface 13 of the FC case 10 and reaching outside the case. An elastic member 50, such as, e.g., a grommet or the like, is attached to the opening 13a to prevent direct contact between the edge of the opening 13a and the emission pipe 34 and also to seal the gap between the edge of the opening 13a and the emission pipe 34.

The opening 13a of the FC case 10 is located at a position upper or higher in the gravity direction than the lowest portion 38 of the inner surface of the dilution part 32. With the opening 13a located as described above, the space below the opening 13a inside the case can be efficiently used as a space for mounting the dilution device 18, while ensuring to form an ascending wall 13b from the lower surface 11 toward the side surface opening 13a. This makes it possible to ensure the largest possible capacity for the dilution device 18 within the case. Moreover, as the ascending wall 13b can be ensured as a lower end of the opening 13a, it is possible to suppress deterioration in strength of the area where the opening is formed in the FC case 10, and also to readily and reliably attach a ring-like sealing member to the side surface opening 13a.

Below, an operation and effect of the fuel cell system 8 according to the present embodiment will be described.

Air from the oxidizing gas source 42, after being boosted by the air compressor 44 and then suitably moisturized by the humidifier 40, is supplied into the cathode side inlet of the fuel cell stack 12. Meanwhile, the hydrogen gas having flowed from the fuel tank 20 into inside the FC case 10, after being adjusted by the injector 22 to have suitable pressure and a suitable flow amount, is supplied to the anode side inlet of the fuel cell stack 12. In the fuel cell stack 12, oxygen and hydrogen contained in the supplied air are subjected to electrochemical reaction through an electrolyte membrane, whereby power is generated.

The cathode off-gas drained from the cathode side outlet of the fuel cell stack 12 contains water generated through electrochemical reaction, and is sent to the dilution device 18 through the air pressure adjustment valve 16. Meanwhile, the anode off-gas drained from the anode side outlet of the fuel cell stack 12 contains unconsumed hydrogen and water generated through electrochemical reaction, and with the purge valve 14 closed, is supplied again to the anode side inlet to be recirculated, while being boosted by the rotary booster 27. With the purge valve 14 turned to be temporarily opened at a predetermined timing, the anode off-gas is sent to the dilution part 32 through the purge valve 14 and the connecting pipe 15.

In the dilution part 32 of the dilution device 18, the anode off-gas ejected from the ejection outlet 33 is diluted with the cathode off-gas having flowed from the introduction pipe 30 and then emitted through the emission pipe 34 to the outside of the FC case 10. In the above, the water contained in the anode off-gas and the cathode off-gas is transformed into droplets due to strength of the anode gas flowing in a large amount at a high speed before being drained from the dilution device 18 to the downstream. In the above, some of the water may pool on the lower surface 36 of the dilution part 32. In the dilution device 18 according to the present embodiment, as the ejection outlet 33 for the anode off-gas is located at a position upstream of, and higher in the gravity direction than, the lowest portion 38 of the lower surface, closing of the ejection outlet 33 can be avoided or suppressed even in the case where the water pooling on the lower surface of the dilution part 32 freezes due to lowered outside temperature.

An exhaust gas produced from mixing the anode off-gas and the cathode off-gas flows from the emission pipe 34 through the air cutoff valve 28 to the humidifier 40, where the water contained in the exhaust gas is captured by an incorporated porous member to thereby be collected. The water collected by the porous member is used to moisturize the air to be supplied to the fuel cell stack 12. The exhaust gas having passed through the humidifier 40 is emitted to the outside via a silencer.

The present embodiment, in which the humidifier 40 is disposed downstream of the dilution device 18, is advantageous in reducing the height of the FC case 10, as it is unnecessary to dispose a large humidifier 40 in the FC case 10. In addition, in the event the porous member in the humidifier 40 becomes dried for any reason, cross leak through the porous member occurs for mixing hydrogen in the drained gas and air to be supplied to the cathode side. Specifically, when hydrogen subjected to cross leak is supplied together with air to the cathode side of the fuel cell stack 12, water is generated through catalytic reaction, and the generated water is supplied as being contained in a cathode off-gas to the humidifier 40 through the dilution device 18, to be collected. With the above, the dried state of the humidifier 40 can be quickly modified.

Figure 5:
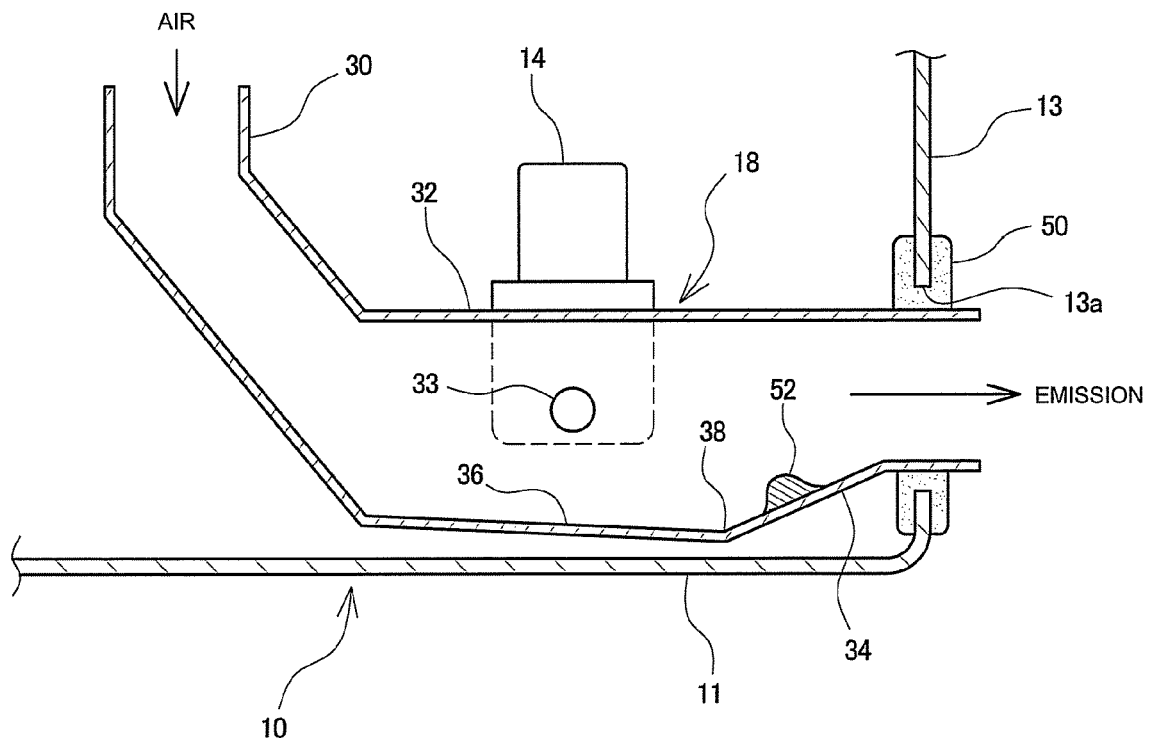
FIG. 5 is a diagram showing a modified example of a dilution device.

Note that the dilution device 18 described in the present embodiment can be changed and modified in various manners. For example, as shown in FIG. 5, a projecting stemming portion 52 may be formed on the lower surface of the ascending emission pipe 34. The stemming portion 52 can prevent water from returning from the emission pipe 34 back to the dilution part 32. Moreover, as reduction of the cross sectional area of the emission pipe 34 at a position corresponding to the stemming portion 52 accelerates the emitting flow speed, the water pooling downstream of the stemming portion 52 can be readily blown toward the downstream side. Further, when the stemming portion 52 and the emission pipe 34 are made of insulating members, insulation with respect to the water pooling on the lower surface 36 of the dilution part 32 can be ensured with a short length of the emission pipe. While, e.g., resin, such as PPS (polyphenylene sulfide), or the like, may be used as the above-described insulating member, the insulating member may be made by coating the surface of the stemming portion 52 and the emission pipe 34 with such insulating resin.

Figure 6:
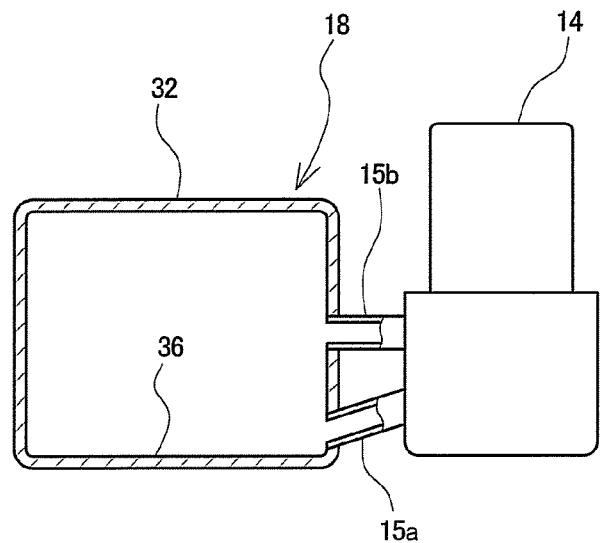
FIG. 6 is a diagram showing a modified example with two connecting pipes provided between a purge valve and a dilution device.

As shown in FIG. 6, the purge valve 14 and the dilution part 32 may be connected by a first connecting pipe 15a communicating with an area in the vicinity of the lower surface 36 inside the dilution part 32 and a second connecting pipe 15b provided in a position upper in the gravity direction than the first connecting pipe 15a. With this structure, even in the case where the water pooling on the lower surface 36 in the dilution part 32 freezes and the first connecting pipe 15a is thus closed, risk of a completely closed state can be avoided, as a path for ejecting the anode off-gas toward the interior of the dilution part 32 through the second connecting pipe 15b is still available. Further, as the first connecting pipe 15a is formed communicating with a position in the vicinity of the lower surface 36 of the dilution part 32, height difference between the anode off-gas outlet of the fuel cell stack 12 and the lower surface 36 inside the dilution part 32 can be best utilized to thereby enhance drain performance. Note that the second connecting pipe 15b is not necessarily connected at a position directly above the first connecting pipe 15a in the gravity direction, and may be disposed at a position with horizontal displacement from the first connecting pipe 15a, so long as that position is higher than the first connecting pipe 15a in the gravity direction.

The invention claimed is:

1. A fuel cell system, comprising:
   a fuel cell for generating power through electrochemical reaction between a gas to be supplied to an anode side and a gas to be supplied to a cathode side;
   a dilution device for diluting an anode off-gas drained from the fuel cell with a cathode off-gas and emitting the anode off-gas; and
   a fuel cell case for accommodating the fuel cell and the dilution device in an interior thereof
   wherein
   a side surface opening of the fuel cell case, through which an emission pipe extending toward downstream in an emission direction of the dilution device passes, is formed at a position upper in a gravity direction than a lowest portion of an inner surface of the dilution device,
   wherein
   the dilution device comprises a mixing portion for mixing the anode off-gas with the cathode off-gas, an anode off-gas introduction pipe connected to the mixing portion for ejecting the anode off-gas into the mixing portion, and a cathode off-gas introduction pipe connected to the mixing portion for introducing the cathode off-gas into the mixing portion; and wherein
   the anode off-gas, which is ejected into the mixing portion from the lateral side of the horizontal direction at the substantially same height position in the gravity direction as the flow of the cathode off-gas introduced into the mixing portion in such a manner that the flow of the anode off-gas opposes the emission direction of the cathode off-gas, collides against the flow of the cathode off-gas in the mixing portion so that the anode off-gas directly expands into the flow of the cathode off-gas to facilitate the mixing of the anode off-gas and the cathode off-gas.

2. The fuel cell system according to claim 1, wherein an ejection outlet through which the anode off-gas is ejected to the interior of the dilution device is formed at a position upstream, in the emission direction, of the lowest portion of the inner surface of the dilution device.

3. The fuel cell system according to claim 1, wherein an ejection outlet through which the anode off-gas is ejected to the interior of the dilution device is formed at a position upper, in a gravity direction, than the lowest portion of the inner surface of the dilution device.

4. The fuel cell system according to claim 1, wherein a humidifier which moisturizes a gas to be supplied to the cathode side of the fuel cell is disposed downstream of the dilution device in the emission direction and to which the emission pipe is connected.

5. The fuel cell system according to claim 1, wherein the emission pipe has a lower surface with an ascending inclination in the emission direction from the lowest portion of the inner surface of the dilution device, and the lower surface has a projecting stemming portion thereon for preventing backward flow of water.

6. The fuel cell system according to 1, wherein the anode side outlet for draining the anode off-gas from the fuel cell is connected to the dilution device via a purge valve controlled into an open or close condition and a connecting pipe provided between the purge valve and the dilution device, and the connecting pipe includes a first connecting pipe connected so as to be in communication with a vicinity of the lower surface of the dilution device, and a second connecting pipe disposed at a position upper, in a gravity direction, than the first connecting pipe.

* * * * *

UNITED STATES PATENT AND TRADEMARK OFFICE
CERTIFICATE OF CORRECTION

PATENT NO.       : 8,697,299 B2                                                  Page 1 of 1
APPLICATION NO.  : 12/742512
DATED            : April 15, 2014
INVENTOR(S)      : Koji Katano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Twenty-ninth Day of September, 2015

Michelle K. Lee
*Director of the United States Patent and Trademark Office*